(12) United States Patent
Holly, III et al.

(10) Patent No.: US 7,088,020 B2
(45) Date of Patent: Aug. 8, 2006

(54) APPARATUS AND METHOD FOR CONSOLIDATING CONDUCTIVE STRANDS OF A STATOR COIL

(75) Inventors: Henry Mason Holly, III, Winter Springs, FL (US); Rex Joel Baker, Fort Payne, AL (US); Kenneth E. Larson, Fort Payne, AL (US); Jeffrey Neal Lankford, Fort Payne, AL (US); Donnie R. Hartman, Fort Payne, AL (US); Bradley Graves Bardsdale, Cedar Bluff, AL (US); David E. Hulsey, Fort Payne, AL (US); Thomas M. Majernik, Pittsburgh, PA (US); Greyson L. Mellon, Las Vegas, NV (US); Robert Alan Ward, Rockledge, FL (US); Curtis E. Bass, York, SC (US)

(73) Assignee: Siemens Power Generation, Inc., Orlando, FL (US)

( * ) Notice: Subject to any disclaimer, the term of this patent is extended or adjusted under 35 U.S.C. 154(b) by 339 days.

(21) Appl. No.: 10/397,414

(22) Filed: Mar. 26, 2003

(65) Prior Publication Data

US 2004/0189109 A1 Sep. 30, 2004

(51) Int. Cl.
*H02K 5/20* (2006.01)
(52) U.S. Cl. ............................ 310/52; 310/54; 310/201
(58) Field of Classification Search .................. 310/52, 310/54, 201, 208, 260
See application file for complete search history.

(56) References Cited

U.S. PATENT DOCUMENTS

| | | | | |
|---|---|---|---|---|
| 4,629,917 A | * | 12/1986 | Brem | 310/59 |
| 5,270,598 A | * | 12/1993 | Holly et al. | 310/71 |
| 5,323,079 A | * | 6/1994 | Nieves et al. | 310/213 |
| 5,422,526 A | | 6/1995 | Kawabata et al. | |
| 5,789,840 A | | 8/1998 | Gould et al. | |
| 6,577,038 B1 | * | 6/2003 | Butman et al. | 310/201 |
| 6,624,547 B1 | * | 9/2003 | Emery | 310/254 |
| 6,784,573 B1 | * | 8/2004 | Iversen et al. | 310/52 |

* cited by examiner

*Primary Examiner*—Burton Mullins

(57) ABSTRACT

A header (10) for use with an inner-cooled half coil (13) in a stator phase winding of an electrical generator. The half coil may include a stack of cooling tubes (16,18) with a first stack of conductive strands (20, 22, 24, 26) adjacent a first side of the stack of cooling tubes and a second stack of conductive strands (20, 22, 24, 26) adjacent a second side of the stack of cooling tubes. A header (10) is conductively bonded (92) by brazing to each strand of the first stack of conductive strands (20, 22, 24, 26) and to each strand of the second stack of conductive strands (20, 22, 24, 26) for consolidating the first and second stacks of conductive strands. A means (34, 36) for allowing a coolant to flow through the header (10) may be provided to allow coolant to flow through the stack of cooling tubes (16, 18). The means (34, 36) for allowing coolant to flow through the header (10) may include a plurality of apertures (34, 36) that are aligned with respective ones of the stack of cooling tubes (16, 18) for inspecting the cooling tubes through the apertures. Conductive connectors (54, 58) may be attached to and removed from the header without affecting the consolidation of the conductive strands.

24 Claims, 3 Drawing Sheets

APPARATUS AND METHOD FOR CONSOLIDATING CONDUCTIVE STRANDS OF A STATOR COIL

FIELD OF THE INVENTION

This invention relates to an induction-type electrodynamic system such as an electrical generator and more specifically to an apparatus and method for connecting the ends of stator coils for such an electrodynamic system.

BACKGROUND OF THE INVENTION

In the stator of a gas inner-cooled electrodynamic power generator, such as a multiphase electrical generator of the type manufactured by the assignee of the present invention, stator coils are constructed of columns or stacks of copper strands and associated stacks of vent tubes through which a coolant such as hydrogen gas may be circulated. Such generators commonly incorporate a plurality of stator coils, which are the high voltage AC winding armature elements that provide the generator's output voltage and current. Stator windings are formed of conductive stator coils in which AC voltage is induced by the passage of the rotating magnetic flux field generated by the generator rotor. Each stator winding may commonly include a plurality of half-coils where each half-coil extends the length of the slot in the stator and is joined to another half-coil or to a phase end lead at the end turn or involute portion of the stator assembly. The half-coil may include two stacks of copper conductor strands and one or more stacks of vent tubes, or other arrangements. The individual copper strands in adjacent strand stacks are transposed to form a pair of braid like roebel bars to reduces losses from cross slot flux and to reduce hot spot temperatures. Such coil arrangements are commonly referred to as single or double tube stack inner-cooled stator coils. Other coil arrangements, such as those using water as the coolant, are known in the art and are similarly constructed.

In the stator coil ends or involutes, the effect of voltage induced by end region flux is conventionally controlled by known connections referred to as a group transposed series connection. Such a connection joins the conductive strands from a first half-coil to corresponding strands in a second half-coil by separating the strands into individual strand groups. Each of the strand groups is then joined with a corresponding strand group in an individual series connection. This process is labor-intensive, time consuming and cumbersome. First, the individual strands must be separated and their strands regrouped into specified bundles. The strands must also be cleaned, tinned, bundled into clips, and soldered into the series connector. The purpose of tinning is to provide a uniform solder coating that will prevent voids when the strands are bundled into crimped or bolted connectors and heat fused together. The exposed strand ends are first cleaned with an abrasive wheel or by hand and are then wiped with alcohol to remove dust and other contaminates. Next, the strands are brushed with a rosin alcohol flux to prepare the copper surface for tinning. The copper strand ends are then hand dipped into heated solder. Excess solder is allowed to drip off and is smoothed by wiping. An alternative method, which is more reliable but far more laborious, is to apply the solder coating by hand, to each strand individually, using a soldering iron with a thermocouple attached to control soldering temperature.

Either method is time consuming, arduous and requires considerable skill and care to achieve uniform tinning. A deviation from precise temperature/time process requirements produces weak and uneven adhesion between the copper and the solder. Lumps and irregular thickness of solder may also be produced. When these strands are fitted into a bolted series or phase connector, their uneven coating may prevent effective tightening. Cold solders may cause voids to develop between strands, which can cause the unit to fail ultrasonic inspection. In that case, the entire process must be done over. Further, while tinning is usually done on-site, it is sometimes performed at the stator coil manufacturing facility prior to shipment of the coil to a site. However, the tinning process may be repeated on-site due to damage during shipment and/or the need to meet on-site specifications to ensure a proper conductive connection between the half coils. The working space for on-site tinning and connecting the half coil ends is often cramped, which may lead to an inferior connection. The cost of on-site rework, delays and making inferior connections between half coils can be considerable.

Furthermore, retrofitting and/or providing other maintenance services on existing electric generators having such transposed connections are time consuming and expensive. For example, a series connection transposition may short due to aging insulation surrounding part of the connection. In this respect, determining the location of the short and repairing and/or replacing series transposed connections related to the short is labor intensive, causing significant downtime of the generator, which may lead to a significant loss of revenue for the operator.

A solid series connector is disclosed in U.S. Pat. No. 5,270,598 that includes a first and second conductor clip where each clip is brazed only to an outer stack of conductive strands in a single tube stack inner-cooled half coil. A braze alloy may be placed on the outer surfaces of the stacks for brazing the conductor clips to the outer stacks. Conductor members may be brazed to the outer surfaces of the conductor clips to conductively connect a pair of half coils. It has been determined that removal of the conductor members for maintenance and/or repair of a half coil may disturb the consolidation of the conductive strands within each stack, which may lead to costly repairs.

SUMMARY OF THE INVENTION

In view of the above, it would be advantageous to provide an apparatus and method for consolidating the stacks of conductive strands within a half coil that provides a connector for conveniently and effectively connecting the ends of the half coil to another half coil or a circuit ring, for example, of an electrical generator.

An inner-cooled half coil for use in a stator phase winding of an electrical generator is provided that may include a stack of cooling tubes with a first stack of conductive strands adjacent a first side of the stack of cooling tubes and a second stack of conductive strands adjacent a second side of the stack of cooling tubes. A header may be conductively bonded to each strand of the first stack of conductive strands and to each strand of the second stack of conductive strands for consolidating the first and second stacks of conductive strands. One aspect allows for each strand of the first and second stacks of conductive strands to be conductively bonded to the header by brazing. A means for allowing a coolant to flow through the header may be provided to allow coolant to flow through the stack of cooling tubes. One aspect allows for the means for allowing coolant to flow through the header to include a plurality of apertures that are aligned with respective ones of the stack of cooling tubes for inspecting the cooling tubes through the apertures.

Another aspect provides a double-header for consolidating a plurality of stacks of conductive strands in an inner-cooled half coil for use as part of a stator phase winding in an electrical generator wherein the half coil includes at least one stack of cooling tubes with respective ones of the plurality of stacks of conductive strands adjacent the at least one stack of cooling tubes. The double-header may include a first header that includes a first exterior conductive member and a first interior conductive member. The first header may be conductively bonded to each strand of a first and second stack of conductive strands for consolidating the first and second stacks of conductive strands and so that the first header may be conductively connected with another device of the electrical generator. A second header may include a second exterior conductive member and a second interior conductive member. The second header may be conductively bonded to each strand of a third and fourth stack of conductive strands for consolidating the third and fourth stacks of conductive strands and so that the second header may be conductively connected with another device of the electrical generator. An insulating barrier may be disposed between the first header and the second header. One aspect allows for a means for allowing coolant to flow through at least one of the first header and the second header. The means for allowing coolant to flow through at least one of the first header and the second header may include at least one aperture formed in the first interior conductive member and at least one aperture formed in the second interior conductive member.

A method for consolidating the stacks of conductive strands of an inner-cooled half coil end of an electrical generator is the provided and may include providing a conductive header wherein each strand of a stack of conductive strands of the half coil is conductively bonded to the conductive header and the header may be conductively connected to another device associated with the electrical generator such as another half coil end or a circuit ring. A passageway may be formed in the header for allowing coolant to flow through the header. The passageway may be aligned with a cooling tube disposed adjacent to the conductive stack of strands to facilitate inspection of the cooling tube through the passageway while the half coil is being manufactured and/or used in operation. An insulating barrier may be placed within the conductive header to electrically insulate respective ones of the stacks of conductive strands.

BRIEF DESCRIPTION OF THE DRAWINGS

These and other advantages of the invention will be more apparent from the following description in view of the drawings that show.

DETAILED DESCRIPTION OF THE INVENTION

Figure 1:
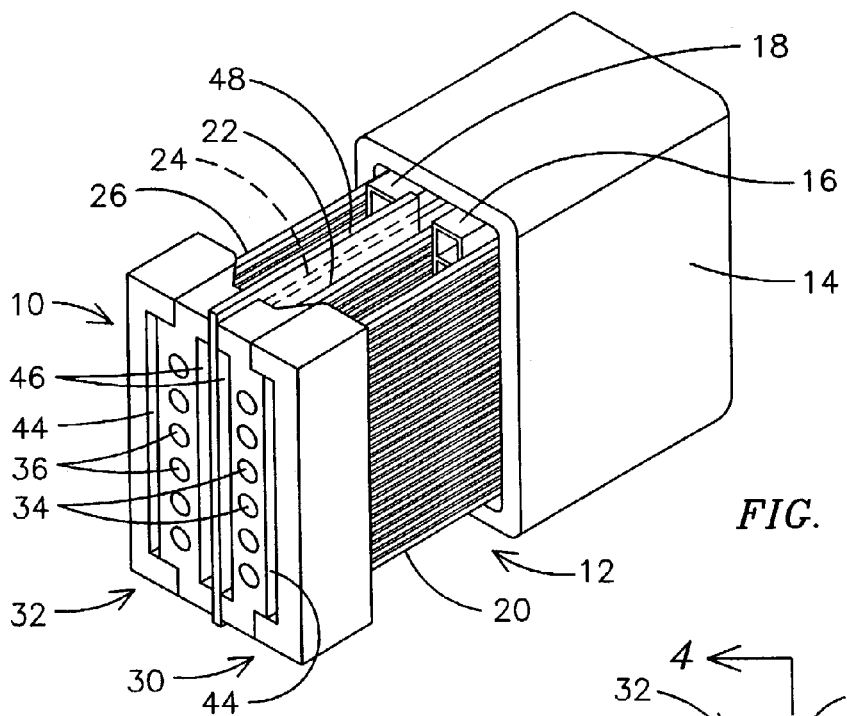
FIG. 1 is a perspective view of an exemplary embodiment of a double-header assembly in accordance with aspects of the present invention.

FIG. 1 illustrates a perspective view of an exemplary embodiment of an apparatus or double-header assembly 10 for consolidating the stacks of conductive strands in a half coil assembly and providing a means for conductively connecting those conductive strands to another device. For example, the double-header 10 allows for a first half coil end 12 of a half coil 13, shown in FIG. 5, to be conductively connected to a second half coil end for use in an electrodynamic system, such as an electrical generator, in accordance with aspects of the present invention. It will be recognized by those skilled in the art that various embodiments of the present invention may be configured for use with a range of stator coils such as those known as single and double tube stack inner-cooled stator coils, hair pin coils, or half of a double tube stack inner-cooled stator coil, for example.

As shown in FIG. 1, the first half coil end 12 may be configured, for purposes of example, as a double tube stack inner-cooled stator coil arrangement encased within a groundwall 14. A first tube stack 16 and a second tube stack 18 function as a means for allowing coolant to pass through the half coil 13. A first stack of conductive strands 20, a second stack of conductive strands 22, a third stack of conductive strands 24 and a fourth stack of conductive strands 26 are configured to form the double tube stack arrangement. The conductive strands are typically copper and are wound to form two Roebel bars of the double tube stack arrangement. The groundwall 14 may be applied using known techniques such as placing the half coil 13 in a vessel where it may be vacuum pressure impregnated with a known resin composition, for example.

Figure 2:
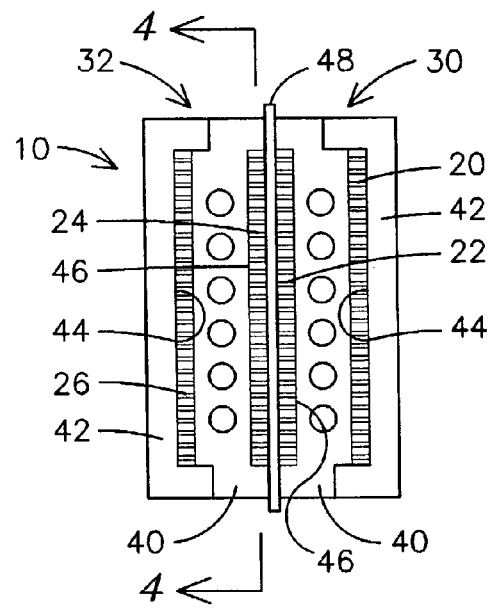
FIG. 2 is a front view of the double-header assembly of FIG. 1
Figure 3:
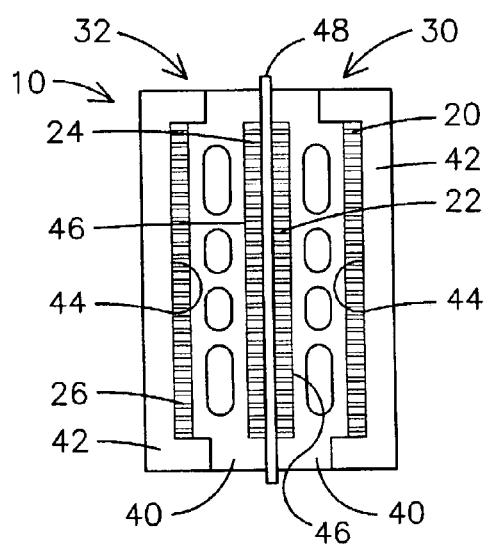
FIG. 3 is a front view of another exemplary embodiment of the double-header assembly of FIG. 1.

One aspect of the present invention allows for the double-header 10 to include a first header 30 and a second header 32 that may be composed of a suitable conductive material such as copper or a copper alloy, for example. Other compositions will be recognized by those skilled in the art. With respect to half of a double tube stack inner-cooled stator coil, it will be recognized by those skilled in the art that only one of the first and second headers 30 and 32 will be needed in accordance with aspects of the present invention. For certain uses of the double-header 10, such as a fully insulated connection where the goundwall 14 extends out over a connection made between the double-header 10 and another device, means may be provided for allowing coolant to flow through the double-header 10. A first means for allowing coolant to pass through the double-header 10 may be provided and may include a first plurality of apertures 34 formed in the first header 30 and a second plurality of apertures 36 formed in the second header 32. One exemplary embodiment allows for each plurality of apertures 34 and 36 to be evenly spaced along a central axis as shown in FIG. 2. The number, size and location of apertures 34 and 36 or other means for allowing coolant to pass through double-header 10 may be a function of the volume of coolant that needs to flow through the respective headers and the amount of current or current density that needs to flow across the first header 30 and/or the second header 32. In this respect, one exemplary embodiment allows for the total cross-sectional flow area of the apertures 34 in the first header 30 to be approximately 0.88 in$^2$ where the apertures may be of two different sizes and substantially oblong as shown in FIG. 3. Other configurations or means for allowing coolant to pass or flow through the double-header 10 will be recognized by those skilled in the art. For example, at least one slot may be formed between two or more apertures of one or both of the plurality of apertures 34 and 36 or the apertures may have various geometric shapes and sizes, for example.

The first and second plurality of apertures 34 and 36 may also be sufficiently aligned with respective stacks of tubes 16 and 18 to allow for proper ventilation or cooling of the stator coil and for accessing the tubes 16 and 18 for inspection purposes during manufacture and/or use. For example, when double-header 10 is affixed to the first half coil end 12 during manufacture the first and second plurality of apertures 34 and 36 allow for a "checking block" to be run through each tube within the tube stacks 16 and 18 to detect any collapse of the tube walls. A fiber optic borescope may also be inserted through the apertures into the tubes to detect any anomalies in the tubes and the tube ends may be accessed for plugging during application of the groundwall. It will be recognized by those skilled in the art that in certain uses of double-header 10, coolant may flow around the header into the first and second stacks of tubes 16 and 18, and those tube stacks may not need to be inspected. In this respect, another exemplary embodiment allows for one or both of the first and second headers 30 and 32 to be devoid of a means for allowing a coolant to flow there through.

Figure 4:
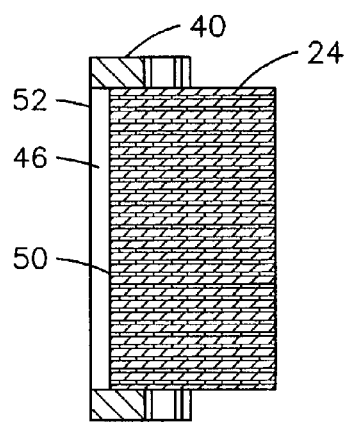
FIG. 4 is a cross section of the exemplary embodiment of FIG. 2 taken along line 4—4.

Referring to FIG. 2 illustrating a front view of double-header 10, one exemplary embodiment allows for the first header 30 and the second header 32 to each be formed of an interior conductive member 40 and an exterior conductive member 42. Members 40 and 42 may be composed of copper or a copper alloy, for example. An alternate embodiment allows for the first and second headers 30 and 32 to be formed of a unitary piece of conductive material. Each exterior conductive member 42 may be formed as an elongated U-shape to form a slot 44 for receiving a respective stack of conductive strands such as the first and fourth conductive strands 20 and 26. The interior conductive member 40 may be formed as an elongated member for mating with the exterior conductive member 42 and may include a slot 46 for receiving a respective stack of conductive strands such as the second and third conductive strands 22 and 24. The interior conductive member 40 may be sized so that respective ones of the first and second plurality of apertures 34 and 36, or other means for allowing coolant to flow through double-header 10, may be formed therein. It will be recognized by those skilled in the art that the means for allowing coolant to flow through the double-header 10 may be formed in one or both of the exterior conductive members 42 and/or one or both of the interior conductive members 40 or various combinations thereof. A temporary ceramic barrier or spacer 48 may be placed between the first and second headers 30 and 32 during manufacture of the half coil 13 to ensure that the first and second headers 30 and 32 are not brazed or otherwise connected together. The barrier 48 may be removed prior to shipping the completed half coil 13 to a site in which case it may be replaced on-site with a temporary insulating barrier while the double-header 10 is being affixed to the first half coil end 12. This temporary barrier, or the original barrier 48 if shipped on-site, may be replaced with a non-ceramic spacer, such as a Dacron felt saturated with an epoxy resin, that acts as a permanent barrier to electrically insulate first and second headers when the half coil 13 is installed in an electrical generator. This may be done on-site when the double-header 10 has been affixed to the first half coil end 12. One exemplary embodiment shown in FIG. 4 illustrates that the end portion 50 of the third stack of conductive strands 24 may be recessed within slot 46 to be below the exterior surface 52 of the double-header 10. The respective end portions of the stacks of conductive strands 20, 22 and 26, not shown in FIG. 4, may also be recessed within respective slots 44 or 46. Conductive alloy material used for brazing the double-header 10 onto the first half coil end 12 may be placed in the channels formed by these recesses as more fully described below.

Figure 5:
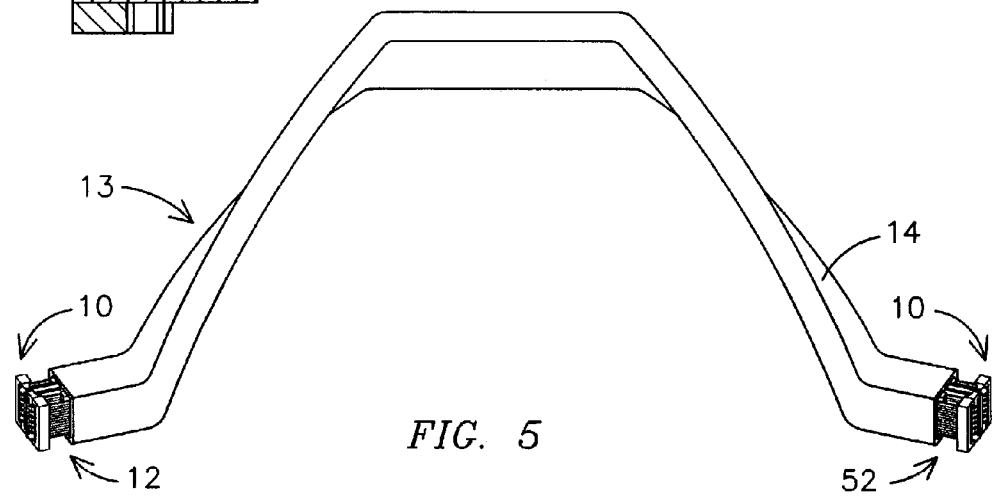
FIG. 5 is a perspective view of an exemplary half coil assembly with the double-header assembly of FIG. 1 affixed to each end in accordance with aspects of the present invention.
Figure 6:
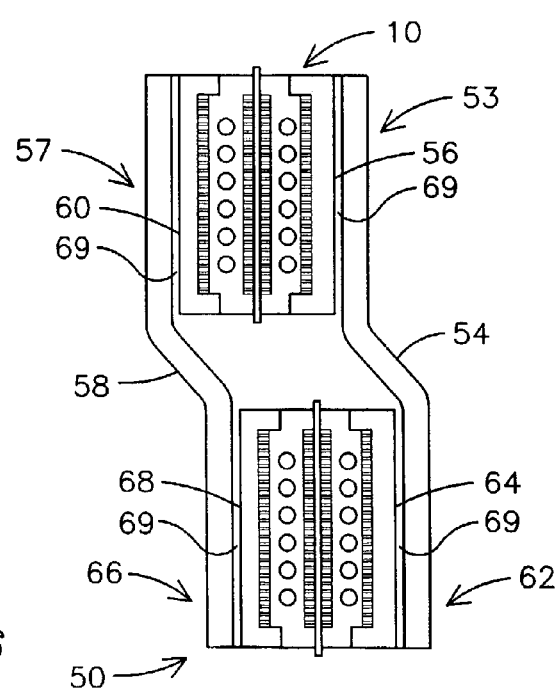
FIG. 6 illustrates one end of the half coil of FIG. 5 and an end of another half coil with the double-header assembly of FIG. 1 affixed thereto.

FIG. 5 illustrates a perspective view of an exemplary double tube stack half coil 13 with an exemplary embodiment of double-header 10 affixed to each of the first half coil end 12 and to the second half coil end 52. The double-headers 10 allow for the respective ends 12 and 52 of the half coil 13 to be conductively connected to another device such as another half coil or a circuit ring of an electrical generator, for example. In this respect and by way of example, as shown in FIG. 6, a conductive connection may be made between respective ends of two half coils having double-header 10 affixed to one end of a half coil and an identical or substantially identical double-header 50 affixed to one end of a second half coil where both are affixed in accordance with aspects of the present invention. To make the conductive connection, an upper end 53 of a first conductive connector 54 may be affixed to a first outer surface 56 of the double-header 10 and an upper end 57 of a second conductive connector 58 may be affixed to the opposing outer surface 60 of the double-header 10. A lower end 62 of the first conductive connector 54 may be affixed to a first outer surface 64 of the double-header 50 and a lower end 66 of the second conductive connector 58 may be affixed to an opposing outer surface 68 of the header 50. The first and second conductive connectors 54 and 58 may be constructed of a suitable conductive material, such as a copper plate or copper alloy, as will be recognized by those skilled in the art. The first and second conductive connectors 54 and 58 may be affixed to respective double-headers 10 and 50 in a conventional manner such as by brazing. A brazing alloy may be introduced between the conductive members 54, 58 and the respective outer surfaces 56, 60, 64, 68 within gaps 69. One advantage of aspects of the present invention is that the first and second conductive connectors 54 and 58 may be removed in the field for performing maintenance and/or repair to an electrical generator without disturbing the consolidation of any respective stack of conductive strands 20, 22, 24 and/or 26. In this respect, exemplary embodiments of double-headers 10 and 50 maintain the consolidation of the respective stacks of conductive strands. This consolidation integrity ensures that the electrical conductivity connection between a double-header 10 or 50 and another device is maintained after services are performed and the double-header is conductively reconnected.

Figure 7:
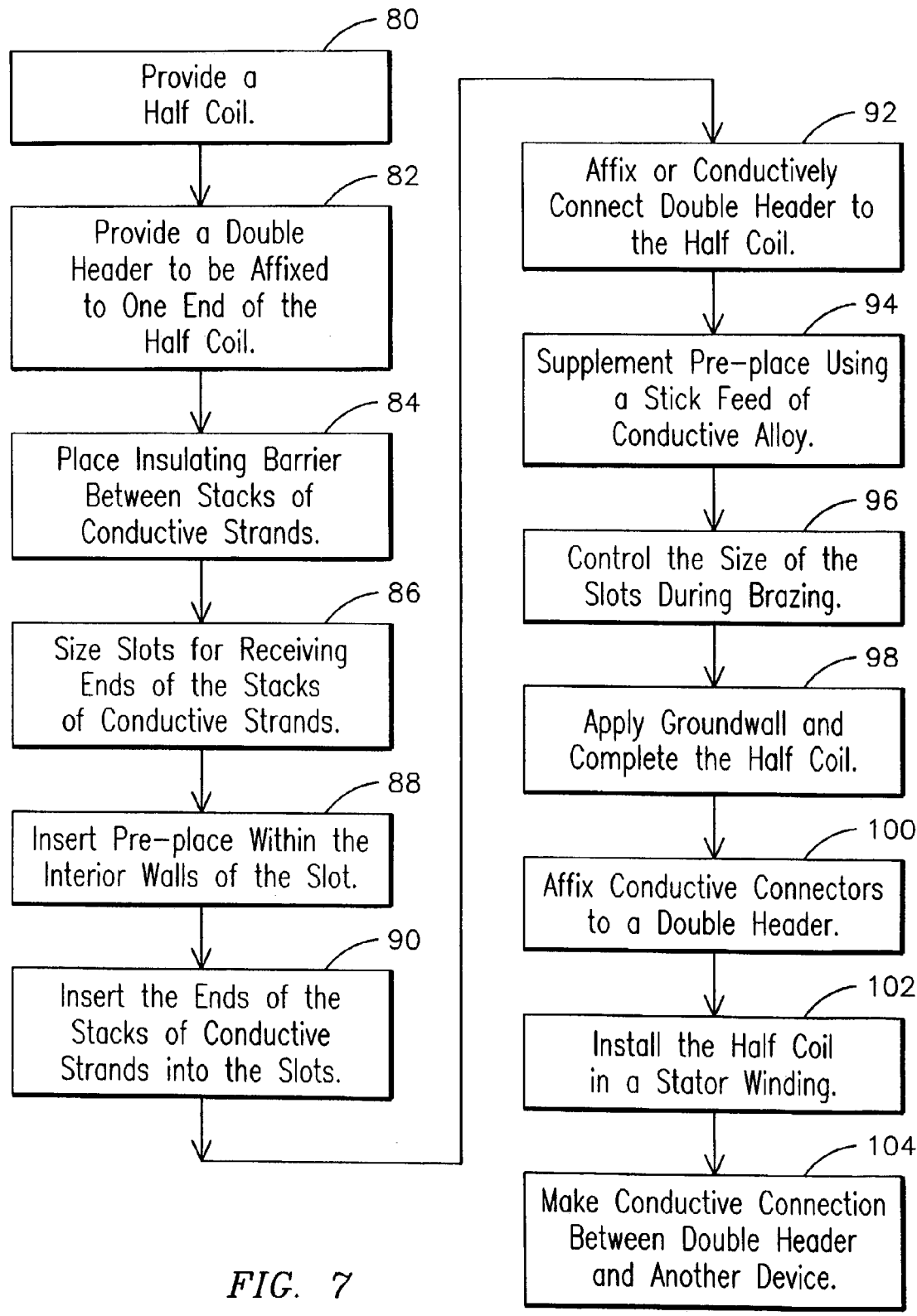
FIG. 7 is a flow diagram of an exemplary method of manufacturing a half coil in accordance with aspects of the present invention.

One aspect of the present invention allows for an exemplary method for manufacturing a stator half coil such as half coil 13, for example. FIG. 7 illustrates exemplary steps in which step 80 allows for providing a half coil 13 having first and second ends 12 and 52 in condition for having a double-header 10 affixed thereto. The half coil 13 may be positioned within a vertical shaft so that one of the ends is exposed for being "fit-up" or prepared for affixing a double-header 10. Step 82 allows for providing a double-header 10 that may comprise a first header 30 and a second header 32 in accordance with aspects of the present invention to be affixed to one end of the half coil 13. Alignment pins (not shown) may be inserted between respective interior conductive members 40 and exterior conductive members 42 to stabilize them while the double-header 10 is being fit-up for attachment to the end of the half coil 13. During the fit-up process, step 84 allows for securing an insulating barrier, such as ceramic barrier 48, between the second stack of conductive strands 22 and the third stack of conductive strands 24 to insulate the first and second stacks of conductive strands 20 and 22 from the third and fourth stacks of conductive strands 24 and 26 in a double tube stack configuration of half coil 13. Alternate embodiments allow for placing a conductive barrier in various places as a function of the stator coil configuration. Step 86 allows for sizing slots 44 during fit-up so that they may receive respective ends of the stacks of conductive strands 20 and 26. In this respect, each exterior conductive member 42 may be temporarily secured with its mating interior conductive member 40 with alignment pins. They may therefore be adjusted relative to each other so that the slots 44 are sufficiently sized during fit-up.

Step 88 allows for inserting one or more pieces or sheets of a "pre-place" material within the interior walls of the interior and exterior conductive members 42 and 40 that define slots 44, 46. An alternate embodiment allows for the pre-place material to be affixed to the outer surfaces of the ends of the stacks of conductive strands 20, 22, 24 and 26 prior to be inserted into slots 44, 46. Pre-place material may be inserted within slots 46 and against the barrier 48. The pre-place material may be an alloy film and have a composition of known materials used for brazing such as the commercially available composition known as Sil-Fos. The pre-place material may become part of the braze and allows for a conductive connection between the first and second headers 30 and 32 and each respective conductive strand situated within slots 44 and 46. One aspect of the present invention allows for the resulting thickness of the pre-place material within a slot to not exceed 0.005 inches after the braze is complete and in one exemplary embodiment the resultant interface formed by the pre-place material may be between about 0.002 and 0.003 inches thick. In this respect, it has been determined by the inventors of the present invention that the strength of the double-header 10 may be compromised after being affixed to one end of the half coil 13 if the resulting thickness of the pre-place material exceeds the above 0.005 inches limit. It will be recognized by those skilled in the art that the resulting thickness of the pre-place material may vary as a function of the dimension of the double-header 10 and stacks of conductive material. After inserting the pre-place material, step 90 of the fit-up process allows for inserting the respective ends of the stacks of conductive strands 20, 22, 24 and 26 into respective ones of the slots 44 and 46.

Clamping means may be placed around the double-header 10 assembly during the fit-up process to hold the respective components in place for affixing the double-header 10 to the half coil 13. Step 92 allows for affixing or conductively bonding or connecting the double-header 10 to the end of the first half coil 13. One exemplary embodiment allows for this connection to be made by brazing and may be done using a vertical brazing process where the half coil 13 is suspended vertically during the braze, or the brazing could be done in a horizontal configuration. During the brazing process, step 94 allows for supplementing the pre-place material by depositing or "stick feeding" a conductive alloy into one or more of the respective slots 44 and/or 46. Step 96 allows for controlling the size of slots 44 during the brazing process such as by adjusting the clamping means positioned around the double-header 10. In this respect, the clamping means may apply a continuous force against the outside surfaces 56, 60 and 64, 68 of the double-header 10 during brazing so that the respective exterior conductive members 42 are held in place or urged inwardly toward the barrier 48. This may slightly narrow the width of the slots 44 and facilitate the flow of the melted pre-place material and conductive alloy in slots 44 and 46 into air pockets and/or other spaces within the stacks of conductive strands, 20, 22, 24 and 26 and into any such spaces between those conductive strands and the interior walls of the slots 44 and 46. It has been determined that this process achieves a superior consolidation of the stacks of conductive strands and conductively bonds each strand to the double-header 10. A superior fillet within the conductive strands is achieved during consolidation of the strands that enhances the integrity of their conductive bond to the double-header 10.

A double-header 10 may be affixed to respective ends of the half coil 13 in accordance with the exemplary method described above. The half coil 13 may then have a ground-wall 14 applied and be completed in step 98. Step 100 allows for installation of the half coil 13 in a stator winding, such as that of an electrical generator. Step 102 allows for the first and second conductive members 54 and 58 to be affixed to the respective outer surfaces of double-header 10 such as by brazing. A temporary insulating barrier may be placed between respective stacks of conductive strands 22, 24, 26 and 28 during the braze then replaced with a permanent barrier after the braze such as a Dacron felt saturated with an epoxy resin or other suitable material. Step 104 allows for making a conductive connection between the double-header 10 affixed to the half coil 13 and another device such as another double-header 10 on a separate half coil, such as that shown in FIG. 6, or a circuit ring of an electrical generator, for example.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim:

1. An inner-cooled half coil for use in a stator phase winding of an electrical generator, the half coil comprising:
    a stack of cooling tubes;
    a first stack of conductive strands adjacent a first side of the stack of cooling tubes;
    a second stack of conductive strands adjacent a second side of the stack of cooling tubes;
    a header conductively bonded to each strand of the first stack of conductive strands and to each strand of the second stack of conductive strands for consolidating the first and second stacks of conductive strands; and
    means for allowing a coolant to flow through the header comprising a plurality of apertures formed in the header.

2. The half coil of claim 1 wherein each strand of the first and second stacks of conductive strands is conductively bonded to the header by a brazed joint.

3. The half coil of claim 1, wherein the plurality of apertures are aligned with respective ones of the stack of cooling tubes for inspecting the cooling tubes through the apertures.

4. The half coil of claim 1, the header comprising:
an interior conductive member; and
an exterior conductive member that mates with the interior conductive member to form a slot there between for receiving the first stack of conductive strands.

5. The half coil of claim 1 further comprising:
a recess formed in the interior conductive member for receiving the second stack of conductive strands.

6. The half coil of claim 1, the means for allowing a coolant to flow through the header comprising a plurality of apertures formed in the interior conductive member and aligned with respective ones of the stack of cooling tubes for inspecting the cooling tubes through the apertures.

7. An inner-cooled halt coil for use in a stator phase winding of an electrical generator, the half coil comprising:
a first stack of cooling tubes;
a second stack of cooling tubes;
a first stack of conductive strands adjacent a first side of the first stack of cooling tubes;
a second stack of conductive strands adjacent a second side of the first stack of cooling tubes;
a third stack of conductive strands adjacent a first side of the second stack of cooling tubes;
a fourth stack of conductive strands adjacent a second side of the second stack of cooling tubes;
a first header conductively bonded to each strand of the first and second stacks of conductive strands for consolidating the first and second stacks of conductive strands;
a second header conductively bonded to each strand of the third and fourth stacks of conductive strands for consolidating the third and fourth stacks of conductive strand; and
the first header and the second header each comprising respective ones of;
an interior conductive member having a first slot formed therein for receiving a first stack of conductive strands; and
an exterior conductive member mated with the interior conductive member to form a second slot there between for receiving a second stack of conductive strands.

8. The half coil of claim 7 further comprising:
means for allowing a coolant to flow through at least one of the first header and the second header.

9. The half coil of claim 8, the means for allowing a coolant to flow through at least one of the first header and the second header comprising at least one aperture formed in the first header and at least one aperture formed in the second header.

10. The half coil of claim 7 further comprising:
a first plurality of apertures formed in the first header in alignment with the first stack of cooling tubes; and
a second plurality of apertures formed in the second header in alignment with the second stack of cooling tubes.

11. The half coil of claim 10 further comprising:
at least one slot connecting at least two apertures selected from the first plurality of apertures and the second plurality of apertures.

12. The half coil of claim 7 further comprising:
means for allowing a coolant to flow through at least one of the first header and the second header.

13. The half coil of claim 12, the means for allowing a coolant to flow through at least one of the first header and the second header comprising a first plurality of apertures formed in the first header and a second plurality of apertures formed in the second header.

14. The half coil of claim 13 wherein the first plurality of apertures is formed in the interior conductive member of the first header and the second plurality of apertures is formed in the interior conductive member of the second header wherein the first and second plurality of apertures are in alignment with the first and second stacks of cooling tubes to allow for the first and second stacks of cooling tubes to be inspected.

15. The half coil of claim 13 wherein a total cross-sectional flow area of at least one of the first plurality of apertures and the second plurality of apertures is approximately 0.88 in$^2$.

16. The half coil of claim 7 wherein an end portion of each respective stack of conductive strands Is recessed below an exterior surface of respective ones of the first header and the second header so that a conductive alloy may be placed within the recesses for brazing the respective stacks of conductive strands to the first header and the second header.

17. A double-header for consolidating a plurality of stacks of conductive strands in an inner-cooled half coil for use as part of a stator phase winding in an electrical generator wherein the half coil includes at least one stack of cooling tubes with respective ones of the plurality of stacks of conductive strands adjacent the at least one stack of cooling tubes, the double-header comprising:
a first header comprising a first exterior conductive member and a first interior conductive member wherein the first header is conductivity bonded to each strand of a first and second stack of conductive strands for consolidating the first and second stacks of conductive strands so that the first header may be conductively connected with another device of the electrical generator;
a second header comprising a second exterior conductive member and a second interior conductive member wherein the second header is conductively bonded to each strand of a third and fourth stack of conductive strands for consolidating the third and fourth stacks of conductive strands so that the second header may be conductively connected with another device of the electrical generator;
an insulating barrier disposed between the first header and the second header; and wherein the respective ends of the stacks of conductive strands are recessed below an outer surface of the first header and an outer surface of the second header so that a conductive alloy may be placed within recesses during conductive bonding of the respective stacks of conductive strands to the first header and the second header.

18. The double-header of claim 17 further comprising:
means for allowing a coolant to flow through at least one of the first header and the second header.

19. The double-header of claim 18, the means for allowing a coolant to flow through at least one of the first header and the second header comprising at least one aperture formed in the first interior conductive member and at least one aperture formed in the second interior conductive member.

20. The double-header of claim 18, the means for allowing a coolant to flow through at least one of the first header and the second header comprising a first plurality of apertures formed in the first interior conductive member in alignment with a first stack of cooling tubes within the half coil and a second plurality of apertures formed within the second interior conductive member in alignment with a second stack of cooling tubes within the half coil.

21. The double-header of claim 17 further comprising:
a first slot formed between the first interior conductive member and the first exterior conductive member for receiving a respective one of the stacks of conductive strands; and
a second slot formed between the second interior conductive member and the second exterior conductive member for receiving a respective one of the stacks of conductive strands.

22. The double-header of claim 21 further comprising:
a first recess formed in the first interior conductive member for receiving a respective one of the stacks of conductive strands; and
a second recess formed in the second interior conductive member for receiving a respective one of the stacks of conductive strands.

23. The double-header of claim 17 further comprising a layer of brazing alloy disposed between each respective stack of conductive strands and a respective interior surface of the first header and the second header.

24. The double-header of claim 23 wherein the layer of brazing alloy has a thickness of between about 0.001 and 0.005 inches after brazing is complete.

* * * * *